United States Patent
Lee et al.

(10) Patent No.: US 11,688,872 B2
(45) Date of Patent: Jun. 27, 2023

(54) ELECTRODE GAS DIFFUSION LAYER ASSEMBLY WITH CONTROLLED BINDER CONTENT AND FUEL CELL STACK INCLUDING THE SAME

(71) Applicants: Hyundai Motor Company, Seoul (KR); Kia Corporation, Seoul (KR)

(72) Inventors: Woo Jin Lee, Seoul (KR); Young June Park, Gyeonggi-do (KR); Jong Jin Yoon, Gyeonggi-do (KR); In Woo Jang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 86 days.

(21) Appl. No.: 17/398,731

(22) Filed: Aug. 10, 2021

(65) Prior Publication Data

US 2022/0181661 A1    Jun. 9, 2022

(30) Foreign Application Priority Data

Dec. 7, 2020 (KR) .................. 10-2020-0169408

(51) Int. Cl.
*H01M 8/1004* (2016.01)
*H01M 8/0271* (2016.01)
*H01M 8/10* (2016.01)

(52) U.S. Cl.
CPC ....... *H01M 8/1004* (2013.01); *H01M 8/0271* (2013.01); *H01M 2008/1095* (2013.01)

(58) Field of Classification Search
CPC .................. H01M 8/0271; H01M 8/1004
See application file for complete search history.

(56) References Cited

U.S. PATENT DOCUMENTS

2008/0143061 A1 * 6/2008 Steinbach ........... H01M 8/0273
277/654

FOREIGN PATENT DOCUMENTS

KR    2020-0086032 A    7/2020
WO    WO 2015-145128    * 10/2015

* cited by examiner

*Primary Examiner* — Brittany L Raymond
(74) *Attorney, Agent, or Firm* — Fox Rothschild LLP

(57) ABSTRACT

Disclosed are an electrode gas diffusion layer assembly (EGA) and a fuel cell stack including the same. The content of the binder in the electrode and the content of the binder in the adhesive layer that attaches the electrode to the gas diffusion layer (GDL) may be optimized. Thus, it is possible to reduce the occurrence of flooding and the deterioration in durability/performance caused by a dry atmosphere in the EGA including the electrode and the adhesive layer, so that the output density per unit area is improved while the trade-off is minimized.

16 Claims, 3 Drawing Sheets

ELECTRODE GAS DIFFUSION LAYER ASSEMBLY WITH CONTROLLED BINDER CONTENT AND FUEL CELL STACK INCLUDING THE SAME

CROSS-REFERENCE TO RELATED APPLICATION

This application claims under 35 U.S.C. § 119(a) the benefit of priority to Korean Patent Application No. 10-2020-0169408 filed on Dec. 7, 2020, the entire contents of which are incorporated herein by reference.

TECHNICAL FIELD

The present invention relate to an electrode gas diffusion layer assembly (EGA) having improved performance by controlling the content of a binder in an electrode and the content of a binder in an adhesive layer that attaches the electrode to a gas diffusion layer (GDL), and to a fuel cell stack including the same.

BACKGROUND

A fuel cell membrane electrode assembly (MEA) generates energy in a hydrogen vehicle. The MEA includes a cathode electrode, an anode electrode and an electrolyte membrane interposed therebetween. Each of the electrodes that generate a voltage includes a catalyst, a support for supporting the catalyst, and a binder formed therearound to have a small thickness. If the content of a binder in electrodes having the same specification is increased, a disadvantage in terms of water discharge arises.

A gas diffusion layer (GDL) is stacked on the MEA to form an electrode gas diffusion layer assembly (EGA). The EGA is stacked alternately with a separator to form a cell, and the cells are assembled to form a stack. The EGA is configured as a stack and is installed vertically and operated in a vehicle, and for this reason, a difference in water amount between the upper and lower portion of the EGA occurs. In addition, since gas is supplied to the side portion of the electrode while product water is generated in the electrode during operation, the atmosphere of the side portion thereof is drier than that of the central portion thereof.

When the cell is divided into upper and lower portions, the lower portion of the cell becomes a region where the product water accumulates. The product water generated in the electrochemical reaction accumulates in the lower portion by gravity, and as a result, becomes a factor that causes flooding in the lower portion of the cell. For the performance of MEA, it is effective to reduce the binder having hydrophilicity among the electrode constituents in order to reduce flooding, but in this case, the durability and performance of the side portion of the cell may be reduced. That is, on both sides of the cell, a dry atmosphere is formed by the supply gas, so that the amount of water decreases, thus deteriorating the local durability and performance of the cell. In order to alleviate this phenomenon, the binder content may be increased, but that may cause increased flooding in the lower portion of the electrode in the MEA.

However, in the related art, a certain content of a binder has been applied to the entire electrode region without considering the difference in local conditions of the cell. Accordingly, flooding of the cell and deterioration in the local durability and performance of the cell have inevitably occurred.

SUMMARY

In preferred aspects, provided are an electrode gas diffusion layer assembly (EGA) in which the content of a binder in an electrode is higher in a first region than in a second region and the content of a binder in an adhesive layer that attaches the electrode to a gas diffusion layer (GDL) is higher in a fourth region than in a third region, and a fuel cell stack including the same.

In an aspect, provided is an electrode gas diffusion layer assembly (EGA) that may include: an electrolyte membrane; an electrode disposed on the electrolyte membrane; an adhesive layer disposed on the electrode; and a gas diffusion layer (GDL) disposed on the adhesive layer. The the electrode may include a first region having a predetermined area, and a second region extending from one end of the first region. Preferably, the adhesive layer may include a third region having a predetermined area, and a fourth region extending from both ends of the third region. The electrode and the adhesive layer may be stacked on each other so that the extending direction of the second region and the extending direction of the fourth region cross each other. Preferably, a content of a first binder in the first region may be greater than a content of a second binder in the second region, or a content of a third binder in the third region is less than a content of a fourth binder in the fourth region.

The first region may contain water in less amount that water in the second region.

The EGA may further include a sub-gasket in a marginal portion thereof, and the sub-gasket may include a gas introduction portion and a gas discharge portion.

The fourth region may be close to the gas introduction portion and the gas discharge portion.

The third region may be close to the central portion of the electrode, and the fourth region may include a first side portion and a second side portion, which are close to side portions of the electrode.

The content of the first binder in the first region may be about 20 to 50 wt % based on 100 wt % of the first region.

The content of the second binder in the second region may be about 10 to 40 wt % based on 100 wt % of the second region.

The first binder in the first region may have an equivalent weight (EW) of about 800 to 1,100.

The second binder in the second region may have an equivalent weight (EW) of about 600 to 1,000.

The third region may include no binder.

The content of the fourth binder in the fourth region may be about 10 to 300 μg/cm².

A ratio of an area of the first region to an area of the second region may be about 10 to 1:1.

A length of each of first and second side edges parallel to the extending direction of the fourth region may be about 3 to 30% relative to 100% of the entire length of an adhesive layer edge parallel to the extending direction of the fourth region.

Flooding to the first region may be prevented, and the third region may reinforce water in portions close to the gas introduction portion and the gas discharge portion in the GDL.

Further provided is a fuel cell stack that may include the electrode gas diffusion layer assembly (EGA) as described herein.

The fuel cell stack may include a plurality of electrode gas diffusion layer assemblies (EGAs) stacked so that the second region of the electrode is located at the lower side in the direction of gravity.

Other aspects of the invention are disclosed infra.

BRIEF DESCRIPTION OF THE DRAWINGS

The above and other features of the present invention will now be described in detail with reference to certain exemplary examples thereof illustrated in the accompanying drawings which are given herein below by way of illustration only, and thus are not limitative of the present invention, and wherein.

DETAILED DESCRIPTION

Figure 1:
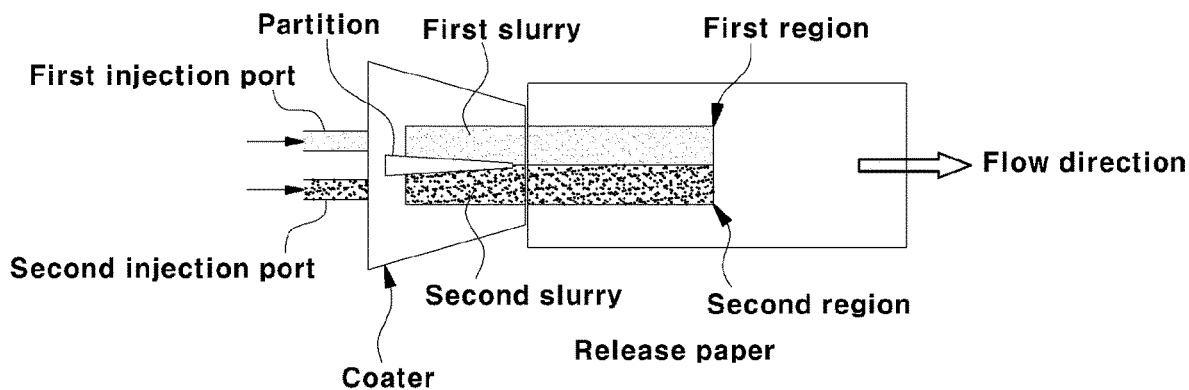
FIG. 1 shows an exemplary method for fabricating an electrode according to an exemplary embodiment of the present invention.

The above objects, other objects, features and advantages of the present invention will become apparent with reference to the embodiments described below in conjunction with the accompanying drawings. However, the present invention is not limited to the embodiments disclosed below and may be embodied in a variety of different forms. Rather, these embodiments disclosed herein are provided so that this invention will be thorough and complete, and will fully convey the spirit of the present invention to those skilled in the art.

Throughout the specification and the accompanying drawings, like reference numerals refer to like components. In the accompanying drawings, the dimensions of structures are exaggerated for clarity of illustration. Although terms such as "first" and "second" may be used to describe various components, the components should not be limited by these terms. These terms are used only to distinguish one component from another component. For example, a first component may be termed a second component without departing from the scope of the present invention, and similarly, a second component may also be termed a first component. Singular expressions include plural expressions unless the context clearly indicates otherwise.

In the present specification, it should be understood that terms such as "include" and "have" are intended to denote the existence of mentioned characteristics, numbers, steps, operations, components, parts, or combinations thereof, but do not exclude the probability of existence or addition of one or more other characteristics, numbers, steps, operations, components, parts, or combinations thereof. In addition, when a part, such as a layer, film, region, plate, or the like, is referred to as being "on" or "above" another part, it not only refers to a case where the part is directly above the other part, but also a case where a third part exists therebetween. Conversely, when a part, such as a layer, film, region, plate, or the like, is referred to as being "below" another part, it not only refers to a case where the part is directly below the other part, but also a case where a third part exists therebetween.

Since all numbers, values and/or expressions referring to quantities of components, reaction conditions, polymer compositions, and mixtures used in the present specification are subject to various uncertainties of measurement encountered in obtaining such values, unless otherwise indicated, all are to be understood as modified in all instances by the term "about." Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Where a numerical range is disclosed herein, such a range is continuous, inclusive of both the minimum and maximum values of the range as well as every value between such minimum and maximum values, unless otherwise indicated. Still further, where such a range refers to integers, every integer between the minimum and maximum values of such a range is included, unless otherwise indicated.

In the present specification, where a range is stated for a parameter, it will be understood that the parameter includes all values within the stated range, inclusive of the stated endpoints of the range. For example, a range of 5 to 10 will be understood to include the values 5, 6, 7, 8, 9, and 10, as well as any sub-range such as 6 to 10, 7 to 10, 6 to 9, and 7 to 9, and also include any value and range between the integers which are reasonable in the context of the range stated, such as 5.5, 6.5, 7.5, 5.5 to 8.5 and 6.5 to 9. For example, a range of "10% to 30%" will be understood to include the values 10%, 11%, 12%, 13%, etc., and all integers up to and including 30%, as well as any sub-range such as 10% to 15%, 12% to 18%, 20% to 30%, etc., and also include any value between the integers which are reasonable in the context of the range stated, such as 10.5%, 15.5%, 25.5%, etc.

The present inventors have conducted extensive studies to reduce the occurrence of flooding in a conventional EGA and reduce the deterioration in local durability/performance caused by a dry atmosphere, and as a result, have found that, in an EGA in which the content of a binder in an electrode is greater in a first region than in a second region and the content of a binder in an adhesive layer that attaches the electrode to a gas diffusion layer (GDL) is greater in a fourth region than in a third region, the occurrence of flooding decreases and deterioration in local durability/performance decreases, thereby completing the present invention.

EGA

An electrode gas diffusion layer assembly (EGA) according to an exemplary embodiment of the present invention includes: an electrolyte membrane; an electrode disposed on the electrolyte membrane; an adhesive layer disposed on the electrode; and a gas diffusion layer (GDL) disposed on the adhesive layer.

The electrolyte membrane according to an exemplary embodiment of the present invention may include a conventional electrolyte membrane usable, for example, one or more selected from the group consisting of perfluorosulfonic acid (PFSA) and hydrocarbon polymers, but is not limited to including a particular component.

The electrode including the above-described component preferably prevents flooding while generating a voltage.

The electrode may be a positive electrode or a negative electrode, which is a conventional electrode. Preferably, the electrodes may be disposed on both surfaces of the electrolyte membrane, and may include a catalyst, a support for supporting the catalyst, and a binder formed therearound to have a small thickness. The catalyst, support and binder may each include a conventional component usable in the present invention. For example, the catalyst may include one or more selected from the group consisting of all fuel cell catalysts, including platinum-, non-platinum- and alloy-based catalysts, and the binder may include one or more selected from the group consisting of perfluorosulfonic acid and hydrocarbon binders, and is not limited to including a particular component.

FIG. 1 shows an exemplary method for fabricating an electrode according to an exemplary embodiment of the present invention. The electrode may be fabricated by a decal method based on a roll-to-roll system. According to the method, the electrode may be fabricated by applying slurries for fabricating the electrode to release paper by means of a coater. Preferably, injection ports for introducing slurries into the coater may include a first injection port for introducing a first slurry, and a second injection port for introducing a second slurry. Furthermore, the inside of the coater may include a partition for separating the first slurry and the second slurry from each other. The partition may have a structure that becomes thinner from the injection port side toward the flow direction which is a discharge portion side. Preferably, the two slurries may meet each other at the end of the discharge portion without the partition, which can ensure that there is no empty space in the electrode coating.

The ratio of an area of the first region to an area of the second region in the electrode fabricated by applying slurries according to the above fabrication method may be about 10 to 1:1. When the area of the first region is excessively small outside the above range, the performance of the reaction portion may deteriorate because the central region where the binder is reduced is excessively large, and when the area of the first region is excessively large, the first region cannot completely include the water accumulation region because the area of the first region is insufficient.

Figure 2:
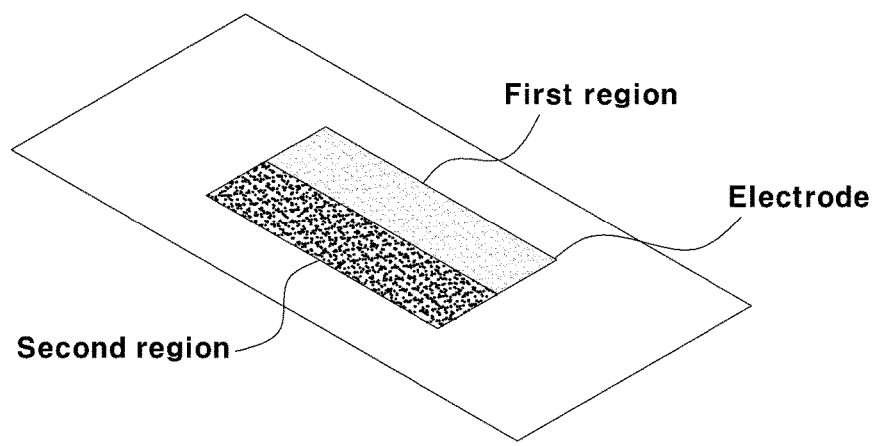
FIG. 2 shows an exemplary electrode according to an exemplary embodiment of the present invention, fabricated according to the method illustrated in FIG. 1.

FIG. 2 shows an exemplary electrode fabricated by the above-described method. For example, the electrode may include: a first region made from the first slurry and having a predetermined area; and a second region extending from one end of the first region and made from the second slurry. Preferably, the first region may be a region in which water in the electrode is contained in small amounts, and the second region may be a region in which water in the electrode is contained in large amounts. Alternatively, the first region may contain water in less amount that water in the second region. The first binder content of the first region may be less than the second binder content of the second region. This is to ensure that a small amount of water is included in the first region by reducing the binder content of the first region, because there is a disadvantage in terms of water discharge when the content of the binder increases. Accordingly, the content of the first binder in the first region may be about 20 to 50 wt % based on 100 wt % of the first region, and the content of the second binder in the second region may be about 10 to 40 wt % based on 100 wt % of the second region. When the contents of the binder in the first region and the second region are excessively low outside the above ranges, performance for cell driving cannot be ensured, and when the contents of the binder in the first region and the second region are excessively high, there is a disadvantage in that it is difficult to ensure durability, due to poor water discharge. In particular, the content of the second binder in the second region is preferably designed to be less than the first binder content of the first region within the above ranges in consideration of product water that accumulates in the second region. Furthermore, the amount of water that is included in each region may be controlled by controlling the equivalent weight of the binder in addition to controlling the content of the binder. Particularly, the equivalent weight (EW) of the second binder in the second region may be about 600 to 1,000, and the equivalent weight (EW) of the first binder in the first region may be about 800 to 1,100. When the equivalent weights of the binders in the first region and the second region are excessively low outside the above ranges, there is a disadvantage in that it is difficult to ensure durability, due to poor water discharge, and when the equivalent weights of the binders in the first region and the second region are excessively high, there is a disadvantage in that it is difficult to ensure performance. In particular, the EW of the second binder in the second region is preferably designed to exceed the EW of the first binder in the first region within the above ranges in consideration of product water that accumulates in the second region.

When EGAs including the electrode that satisfies the above characteristics are stacked later to form a fuel cell stack, the second region in the electrode may be located at the lower side in the direction of gravity. For example, the water generated by the operation of the fuel cell is highly likely to be located at the lower side in the direction of gravity, and thus the possibility of flooding is high. However, when the second region in the electrode is located at the lower side in the direction of gravity, the second region having a relatively low binder content can reduce the amount of the water. As a result, controlling the contents of the binders in the electrode depending on the first region and the second region exhibits the effect of reducing flooding, thus advantageously improving the performance of the fuel cell.

The electrode gas diffusion layer assembly (EGA) may include an adhesive layer disposed on the electrode, and a gas diffusion layer (GDL) disposed on the adhesive layer. Particularly, the EGA may further include, in a marginal portion thereof, a sub-gasket including a gas introduction portion and a gas discharge portion.

The GDL is not particularly limited as long as it is a porous gas diffusion layer that may function to diffuse gas and conduct electricity. The GDL may include, for example, a carbon material, and is not limited to including a particular component.

The adhesive layer suitably may be prepared for example using a liquid solution containing a binder and a solvent so that it can attach the electrode to the GDL to prevent the GDL from being separated from the electrode and, at the same time, can improve durability/performance with the anti-degradation achieved by controlling the content of the binder in the adhesive layer. The GDL may be used after the adhesive layer is applied thereto using the liquid solution and the solvent is dried out. The solvent is not particularly limited and preferably contains one or more polar materials such ean alcohol for instance methanol, ethanol and/or water, which preferably does not leave an undesired residue after drying. For example, the binder that is included in the adhesive layer may include one or more selected from the group consisting of perfluorosulfonic acid (PFSA) and hydrocarbon binders, but is not limited to including a particular component.

Figure 3:
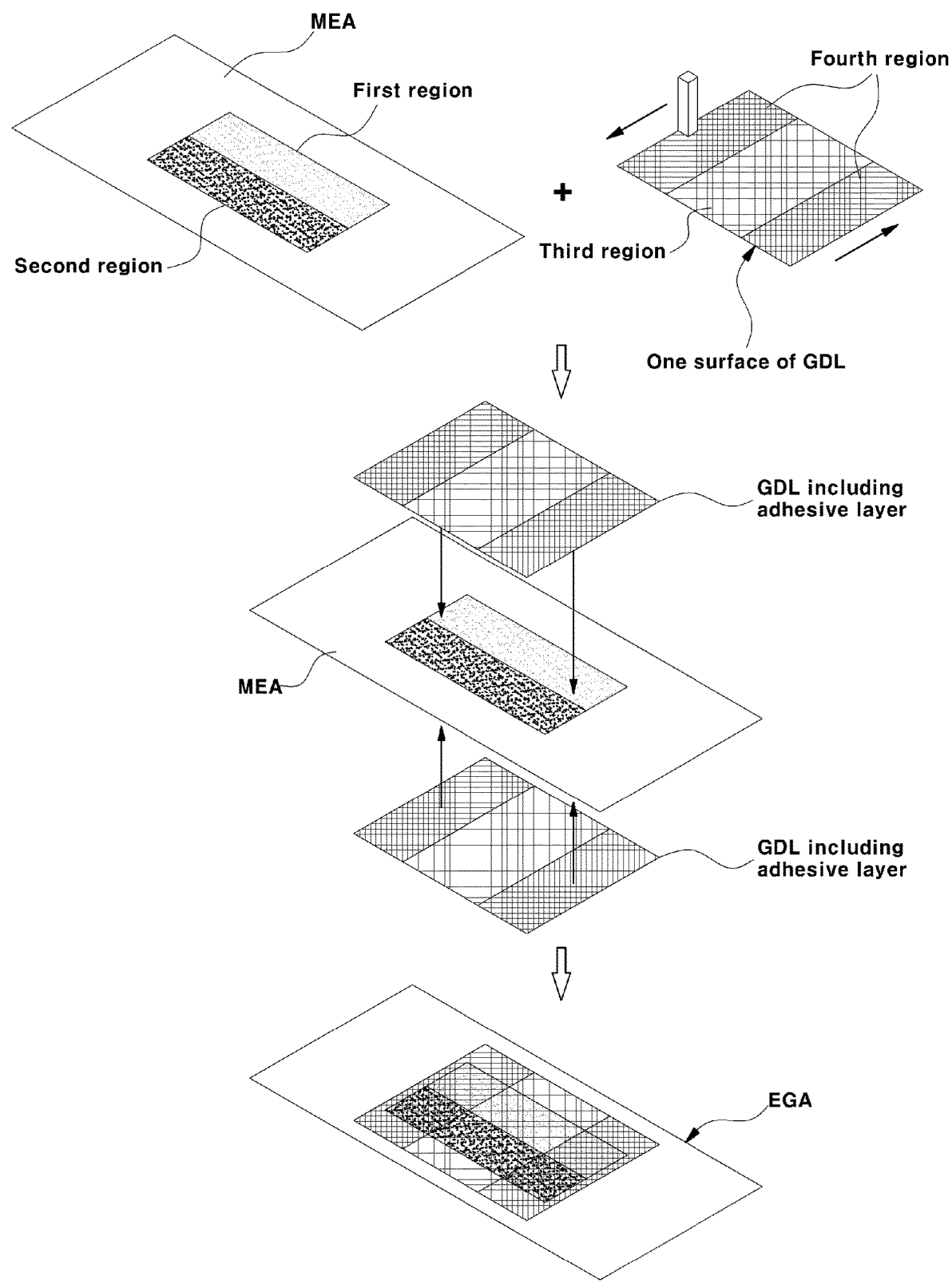
FIG. 3 shows an exemplary method of fabricating an exemplary electrode gas diffusion layer assembly (EGA) by the fabrication method according to an exemplary embodiment of the present invention.

FIG. 3 shows an exemplary method of fabricating an electrode gas diffusion layer assembly (EGA) by the fabrication method according to an exemplary embodiment of the present invention. theretofore example, an MEA is prepared by placing an electrode on an electrolyte membrane, and then placing in the marginal portion thereof a sub-gasket including a gas introduction portion and a gas discharge portion. Thereafter, an adhesive layer is applied to one surface of a GDL so that the adhesive layer includes a third region having a predetermined area and a fourth region extending from both ends of the third region. Next, the electrode and the adhesive layer are stacked on each other so that the extending direction of the second region in the electrode of the MEA and the extending direction of the fourth region in the adhesive layer cross each other, followed by thermal pressing, thereby fabricating an EGA including the MEA and the GDL having the adhesive layer applied thereto.

The length of each of a first side edge and a second side edge, which are parallel to the extending direction of the fourth region in the adhesive layer stacked on the electrode according to the above fabrication method, may be about 3 to 30% relative to 100% of the entire length of an adhesive layer edge which is parallel to the extending direction of the fourth region. When the length of each of the first side edge and the second side edge (parallel to the extending direction of the fourth region) is excessively short outside the above range, defects in bonding or assembly may increase and compensation for dry regions may be incomplete, and when the length of each of the first side edge and the second side edge (parallel to the extending direction of the fourth region) is excessively long, the cost may increase due to the excessive use of the ionomer, and water discharge in the central region may decrease. However, regardless of the edge length ratio, the length of each of the first side and second side edges (parallel to the extending direction of the fourth region) may be preferably at least about 3 mm or greater.

Figure 4:
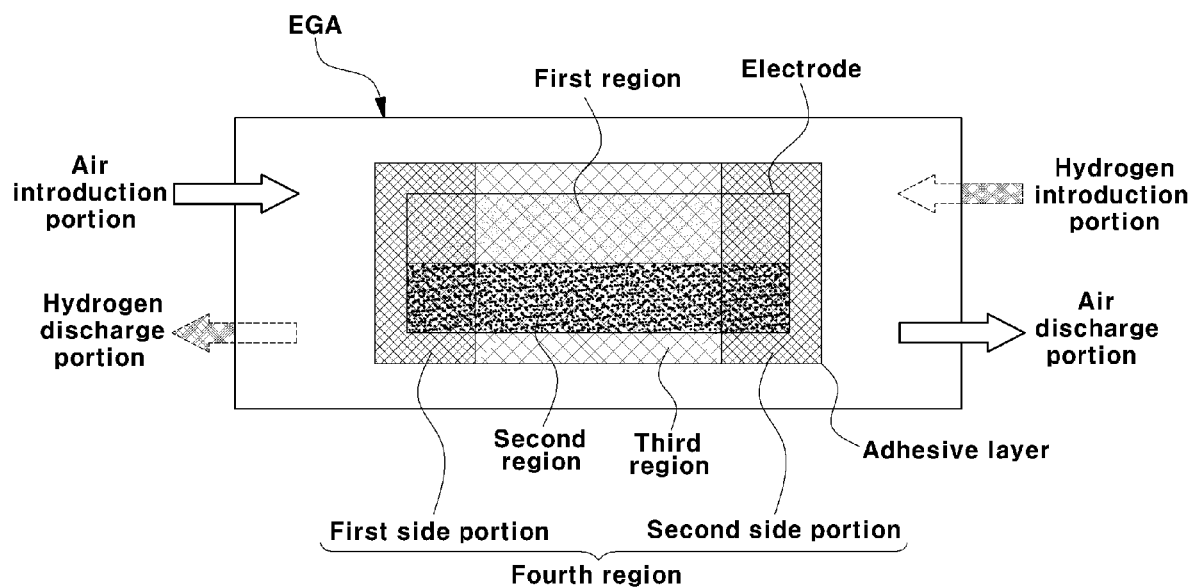
FIG. 4 shows exemplary first region and second region of an electrode and exemplary third region and fourth region of an adhesive layer in the EGA according to an exemplary embodiment of the present invention, fabricated according to the method illustrated in FIG. 3.

FIG. 4 shows the first region and second region of the electrode and the third region and fourth region of the adhesive layer in the EGA fabricated according to the above method. For example, the adhesive layer stacked on the electrode may include a third region having a predetermined area, and a fourth region extending from both ends of the third region. Preferably, the third region may be close to the central portion of the electrode, and the fourth region may be close to a gas introduction portion (composed of an air introduction portion and a hydrogen introduction portion) and a gas discharge portion (composed of an air discharge portion and a hydrogen discharge portion). Particularly, the fourth region may include a first side portion and a second side portion, which are close to the sub-gasket and the side portions of the electrode.

The shape of the fourth region, that is, the shape of each of the first side portion and the second side portion, may be rectangular as shown in FIG. 4. In addition, the fourth region may be trapezoidal in shape as it gets narrower from the first region to the second region of the corresponding electrode contacting therewith. In addition, the fourth region may be a quadrangular shape in which only a portion corresponding to the second region exists without a portion corresponding to the second region. The change in shape of each of the first side portion and the second side portion of the fourth region may reduce water in the fourth region that is in contact with the electrode in consideration of water accumulation in the second region of the corresponding electrode that is in contact with the fourth region.

The third region may be a region in which water in the adhesive layer is contained in small amounts, and the fourth region may be a region in which water in the adhesive layer is contained in large amounts.

In other words, the first region may contain water in less amount that water in the second region. Preferably, the third binder content of the third region may be less than the fourth binder content of the fourth region. This is to improve durability/performance with anti-degradation achieved by compensating for insufficient water content that may occur due to drying of the adhesive layer located near the gas introduction portion and the gas discharge portion, because the content of water increases as the content of the binder increases. Accordingly, the GDL does not contain the binder in the third region, and the content of the fourth binder in the fourth region may be about 10 to 300 $\mu g/cm^2$. When the content of the fourth binder in the fourth region is excessively low outside the above range, there are disadvantages in that it is difficult to bond the GDL and in that the effect of containing water is insufficient because the content of the binder is excessively low. When the content of the fourth binder in the fourth region is excessively high, the cost may increase due to excessive use of the binder, and water discharge may be suppressed beyond an appropriate level, resulting in deterioration in durability.

Fuel Cell Stack

A fuel cell stack includes the above-described EGA. Preferably, the fuel cell stack may include a plurality of the EGAs stacked so that the second region of the electrode in the EGA is located at the lower side in the direction of gravity.

Particularly, the fuel cell stack according to various exemplary embodiments the present invention is characterized in that the content of the binder in the EGA stacked in plural is optimized by designating, as the second region, the lower portion of the electrode in the direction of gravity, which is at risk of flooding due to a relatively large amount of water, so as to reduce the content of the binder in the electrode, and by designating, as the first side portion and second side portion constituting the fourth region, a portion close to the gas introduction portion and gas discharge portion of the sub-gasket, so as to increase the content of the binder in the adhesive layer. Accordingly, the fuel cell stack according to various exemplary embodiments of the present invention has advantages in that it is possible to reduce the occurrence of flooding and the deterioration in durability/performance caused by a dry atmosphere, so that the output density per unit area is improved while the trade-off is minimized.

As described above, the present invention may provide an EGA with a controlled binder content and a fuel cell stack including the same. Particularly, the content of the binder in the electrode and the content of the binder in the adhesive layer that attaches the electrode to the gas diffusion layer (GDL) may be optimized. Thus, it is possible to reduce the occurrence of flooding and the deterioration in durability/performance caused by a dry atmosphere in the electrode gas diffusion layer assembly (EGA) including the electrode and the adhesive layer and, at the same time, it is possible to improve the output density per unit area.

The effects of the present invention are not limited to the above-mentioned effects. It is to be understood that the effects of the present invention include all effects that may be deduced from the above description.

What is claimed is:
1. An electrode gas diffusion layer assembly (EGA) comprising:
   an electrolyte membrane;
   an electrode disposed on the electrolyte membrane;
   an adhesive layer disposed on the electrode; and
   a gas diffusion layer (GDL) disposed on the adhesive layer,
   wherein:

the electrode comprises a first region having a predetermined area, and a second region extending from one end of the first region;

the adhesive layer comprises a third region having a predetermined area, and a fourth region extending from both ends of the third region;

the electrode and the adhesive layer are stacked on each other so that the extending direction of the second region and the extending direction of the fourth region cross each other; and a content of a first binder in the first region is greater than a content of a second binder in the second region, or a content of a third binder in the third region is less than a content of a fourth binder in the fourth region.

2. The electrode gas diffusion layer assembly (EGA) of claim 1, wherein an amount of water in the first region is less than an amount of water in the second region.

3. The electrode gas diffusion layer assembly (EGA) of claim 1, further comprising a sub-gasket in a marginal portion of the gas diffusion layer thereof, wherein the sub-gasket comprises a gas introduction portion and a gas discharge portion.

4. The electrode gas diffusion layer assembly (EGA) of claim 3, wherein the fourth region is close to the gas introduction portion and the gas discharge portion.

5. The electrode gas diffusion layer assembly (EGA) of claim 3, wherein flooding to the first region is prevented, and the third region is replenished with water in portions close to the gas introduction portion and the gas discharge portion in the GDL.

6. The electrode gas diffusion layer assembly (EGA) of claim 1, wherein the third region is close to a central portion of the electrode, and the fourth region comprises a first side portion and a second side portion, which are close to side portions of the electrode.

7. The electrode gas diffusion layer assembly (EGA) of claim 6, wherein a length of each of first and second side edges parallel to the extending direction of the fourth region is 3 to 30% relative to 100% of the entire length of an adhesive layer edge parallel to the extending direction of the fourth region.

8. The electrode gas diffusion layer assembly (EGA) of claim 1, wherein the content of the first binder in the first region is 20 to 50 wt % based on 100 wt % of the first region.

9. The electrode gas diffusion layer assembly (EGA) of claim 1, wherein the content of the second binder in the second region is 10 to 40 wt % based on 100 wt % of the second region.

10. The electrode gas diffusion layer assembly (EGA) of claim 1, wherein the first binder in the first region has an equivalent weight (EW) of 800 g to 1,100 g.

11. The electrode gas diffusion layer assembly (EGA) of claim 1, wherein the second binder in the second region has an equivalent weight (EW) of 600 g to 1,000 g.

12. The electrode gas diffusion layer assembly (EGA) of claim 1, wherein the third region contains no binder.

13. The electrode gas diffusion layer assembly (EGA) of claim 1, wherein the content of the fourth binder in the fourth region is 10 to 300 $\mu g/cm^2$.

14. The electrode gas diffusion layer assembly (EGA) of claim 1, wherein a ratio of an area of the first region to an area of the second region is 10 to 1:1.

15. A fuel cell stack comprising the electrode gas diffusion layer assembly (EGA) of claim 1.

16. The fuel cell stack of claim 15, comprising a plurality of electrode gas diffusion layer assemblies (EGAs) stacked so that the second region of the electrode is located at the lower side of the electrode gas diffusion layer assemblies in the direction of gravity.

* * * * *